Sept. 8, 1970    W. S. PAWL    3,527,046
GLOBE MAP CLOCK

Filed May 21, 1969    3 Sheets-Sheet 1

INVENTOR

Walter S. Pawl

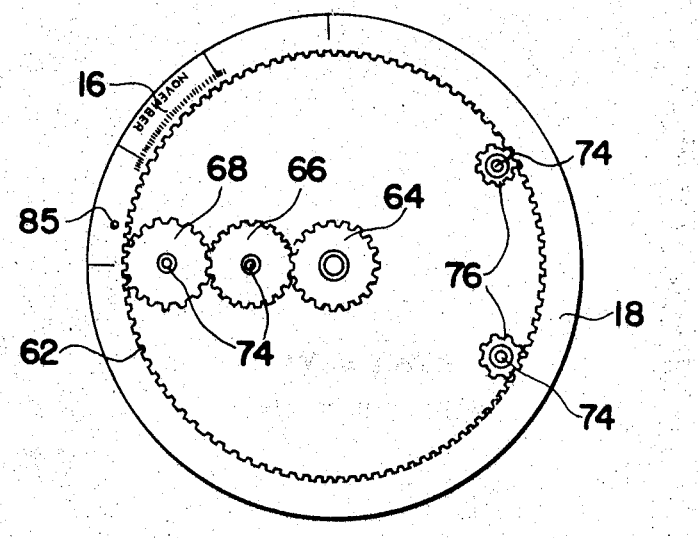
FIG. 3
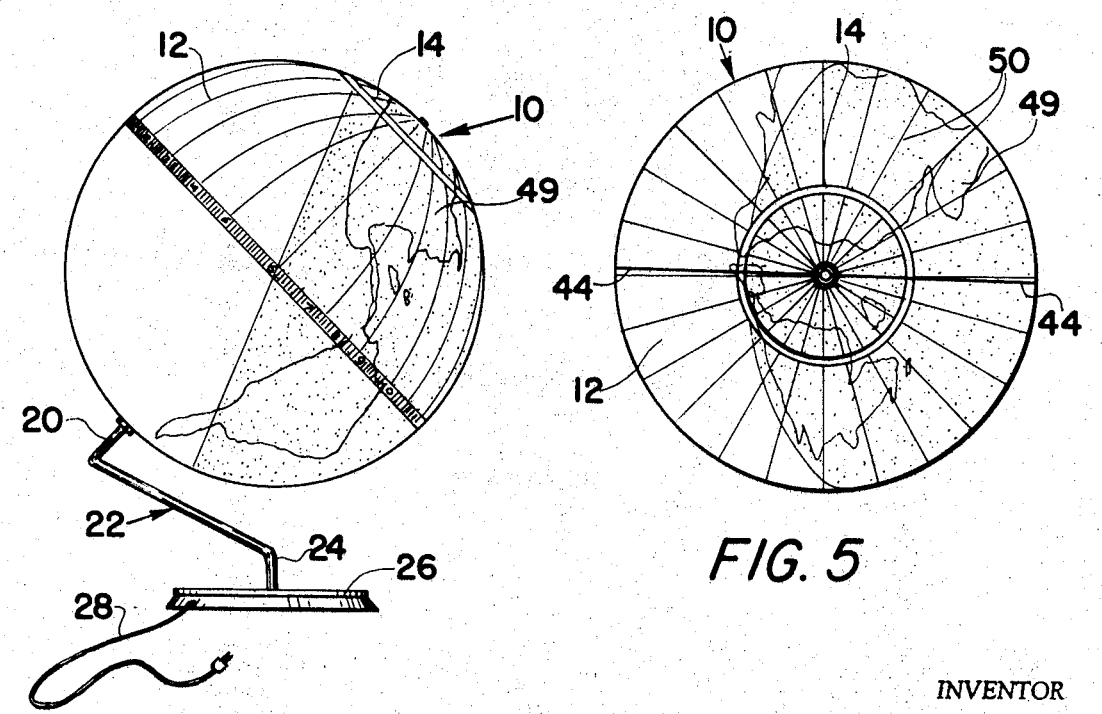
FIG. 4
FIG. 5
INVENTOR
Walter S. Pawl

United States Patent Office 3,527,046
Patented Sept. 8, 1970

3,527,046
GLOBE MAP CLOCK
Walter S. Pawl, 2844 Powder Mill Road,
Adelphi, Md. 20783
Filed May 21, 1969, Ser. No. 826,487
Int. Cl. G04b 19/22
U.S. Cl. 58—44                                    7 Claims

ABSTRACT OF THE DISCLOSURE

This clock is an adaptation of means operated by a 24-hour clockworks mounted inside a transluscent globe map, for rotating a transparent hemispherical shell within the northern portion of the globe about the polar axis, at the rate of one revolution per day. This hemisphere has inscribed on it heavy great circle lines radiating from the polar axis at 15 degree intervals and extending to the equatorial edge of the transparent hemispherical shell where they are designated by their hour numerals from 1 to 12 in counterclockwise direction repeated once to complete the designation of all the 24 line terminals at the Equator. A somewhat darkened hemispherical shell is pivotally mounted diametrically of its edge on the 6 o'clock diameter of the edge of the transparent shell for daily rotation therewith to cast a moving shadow on the globe map indicating the extent of the darkness portion of the earth at any time, there being lights mounted around the clockworks inside the globe. Gearing is provided to tilt the darkened shell from day to day in accordance with the seasons of the year and to drive an annular scale about a pointer indicating the day of the year automatically throughout the year.

Some of the pertinent art relating to this invention may be found in Pats. Nos. 425,833, 2,907,166, 2,550,805 and 2,641,683.

None of these patents, however, nor any other prior art, has been found which has the simplicity of the presently disclosed globe map clock, nor does any of them simulate the actual daily and yearly lighting conditions as closely as the globe clock of the present disclosure.

The object of this invention is to provide a globe clock operated by a 24-hour clockworks inside a translucent globe map shell for driving a daily hour hemisphere of transparent material with hour lines on it radiating from the N Pole and an hour scale at its equatorial edge, by the hour shaft of the clockworks, and for pivoting a darkened hemispherical shell by its edges on the 6 o'clock axis of said hour scale so that it casts a shadow on the darkness side of the globe map, and further driving a gear train to tilt said darkened hemispherical shell on its 6 o'clock pivots in accordance with the seasons of the year automatically.

A further object is to add a minute hand comprising a semicircular wire driven by the minute shaft and extending in spaced relation between the globe map shell and the transparent hemispherical shell, and to inscribe a minute scale globe map shell at the Equator.

A further object is to mount a ring type of neon light tube around the clockworks.

Figure 1:
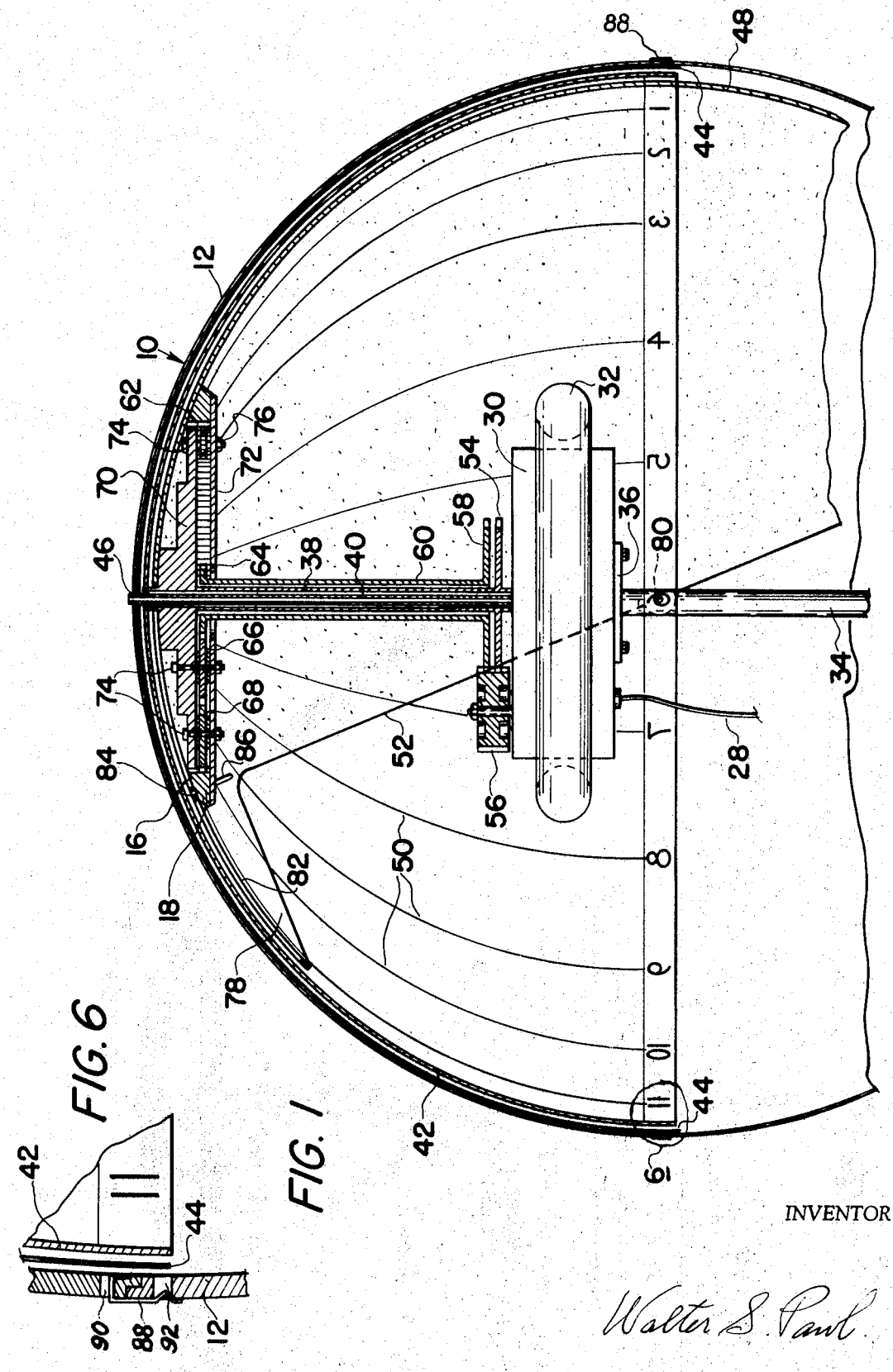
Figure 2:
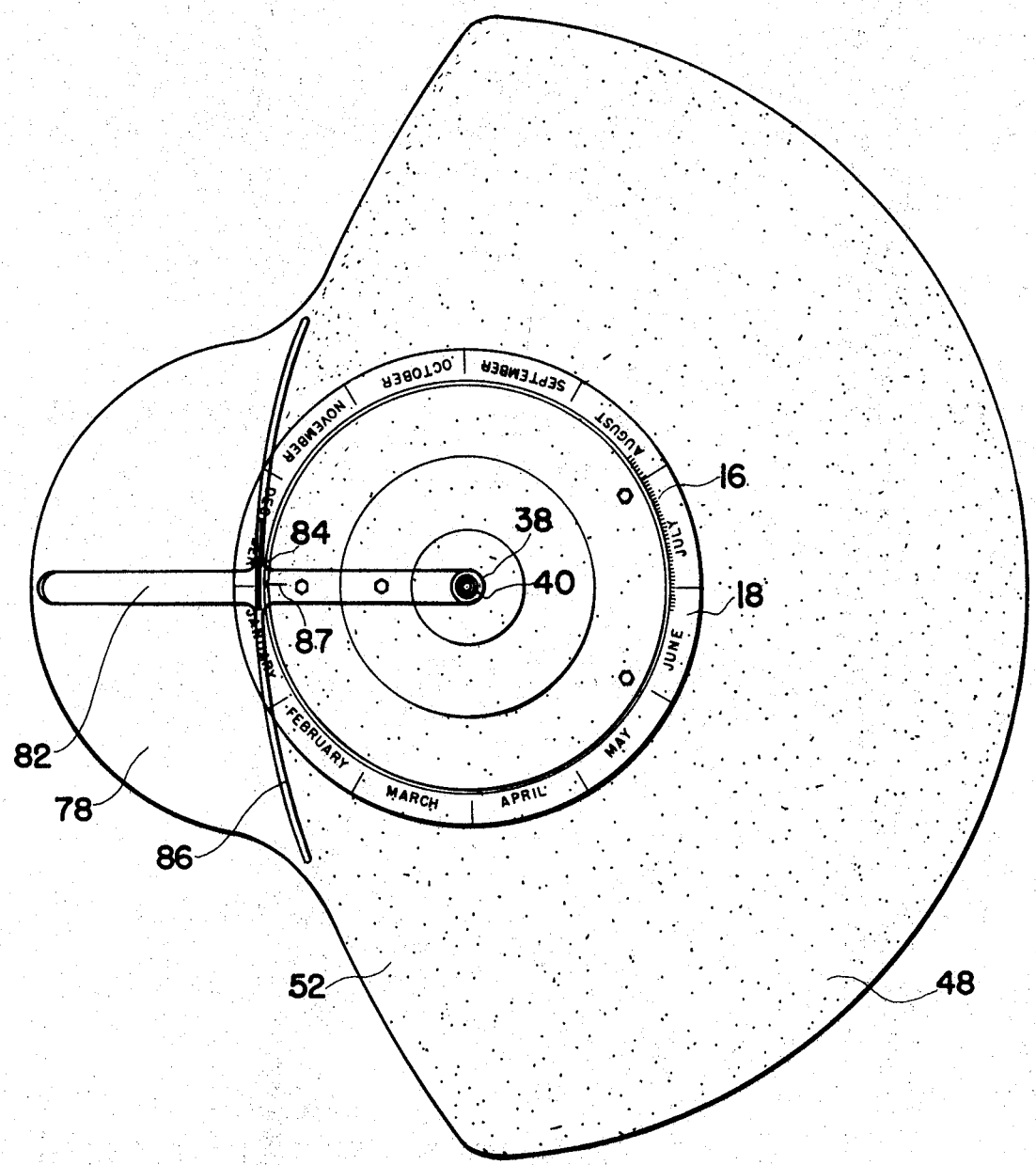

Other and more specific objects will become apparent in the following detailed description of this globe clock as illustrated in the accompanying drawings, wherein:

FIG. 1 is a sectional view of the globe map shell to show the gearing and arrangement of other parts therein, FIG. 2 is a top view of the darkened hemispherical shell and the day scale and gear housing seen under it as shown in FIG. 1, FIG. 3 is a plan view of the day scale and its operating gear train, FIG. 4 is an elevational view of the globe clock mounted on a base and a support arm through which it is supplied with electrical current for the clockworks and lights mounted inside, FIG. 5 is a pole view thereof, and FIG. 6 is an enlarged detail view of a preferred form of joining the two halves of the globe map shell together at the Equator so as to simultaneously provide the marking of the minute scale.

The form of this invention shown in the drawings for purposes of illustration comprises a thin translucent globe map 12 mounted over a transparent globe shell 10, covering its entire surface except for a transparent ring portion at the 67 degree N latitude area 14, which is left clear and through which the month and day indicator scale 16 may be viewed on the day scale ring gear 18 inside the globe.

The globe is mounted rotatably at its polar axis on a shaft 20 at the top of a hollow angled arm 22, the bottom vertical end 24 of which is mounted substantially under the center of gravity of the globe in a base support 26.

An electrical supply cord 28 is provided for connection to a conventional outlet for supplying current to the clockworks 30 and to the circular neon light bulb 32 inside the globe, the cord being extended through a passage in the base support 26 and the hollow angled arm 22 into the inside of the globe, which is made up of the Northern and Southern Hemisphere portions joined at the Equator by any snap lock means, such as e.g. shown in FIG. 6.

A polar shaft 34 is rigidly fixed to the lower or Southern Hemisphere portion and its lower portion provides the rotatable bearing on the upper end of the shaft 20. The upper end of shaft 34 has a support platform 36 on which the clockworks 30 is mounted, so that its hour and minute shafts 38 and 40 respectively, extend in line with the polar axis and drive the transparent hemispherical shell 42 and the minute hands 44 respectively; and the upper end of the minute shaft 40 has a guide bearing 46 at the N Pole in the globe shell 10.

The shell 42 has 24 hour line radiating from the N Pole at 15 degree intervals to its equatorial edge which is inscribed with bold hour numerals at the ends of the hour lines in two successive series around the equatorial edge from 1 to 12, and from west to east.

A hemispherical shell 48 slightly darkened to provide a darkened area 49 on the darkness side of the globe map is pivoted at diametrically opposite points 80 of its twilight edge 52 to the adjacent 6 o'clock portions of the hour scale edge of the shell 42.

Shell 48 has clearly transparent lobe portions 78 extending from its polar edge portions to provide guide slots 82 around the shafts 38 and 34 as the shell 48 is tilted on its pivots 80 by the flat headed guide pin which is swivably mounted at 85 on the ring gear 18. The head of the pin 84 is flat and slides in the cross slot 86, which extends along the base of the N Pole lobe portion 78, so as to tilt the darkened shell 48 in accordance with the day of the year indicated on the ring gear day scale 16.

A gear train beginning with the 74 tooth gear 54 mounted on the hour shaft 38 which drives an idler gear 56 and through it the day gear 58 which has 73 teeth and is mounted on the lower end of the hollow shaft 60 to move the central gear 64 which is mounted on the upper end of hollow shaft 60 $\frac{1}{73}$ of a revolution ahead of the hour shaft 38, correspondingly moves the ring gear 62—whose pitch circle is 5 times that of the central gear 64—only $\frac{1}{365}$ revolution per day so as to correspondingly advance the reading on the day scale 16 every day of the year. The intermediate gears 66 and 68 have the same diameter pitch circle as the central gear 64 so as to transmit the 1 to 5 drive ratio rotation between the ring gear and the central gear, using a common tooth pitch. Thus the central and intermediate gears may each have twenty teeth e.g. and the ring gear one hundred teeth of the same pitch. The intermediate gears are mounted in a housing 70 which is mounted to turn with the hour shaft 38 and has a base plate 72 supported by shaft bolts 74 which also provide the bearings for the intermediate gears 66 and 68 and the idler guide gears 76. The base plate 72 supports the ring gear in its drive relation with the gear 68 and the guide gears 76 to maintain its concentricity with the central gear 64.

The gears 62, 64, 66 and 68 and the gear housing 70 are preferably made of suitable transparent materials in order not to darken the polar region of the globe map too much, but to make it as clearly visible as the rest of the map.

The equatorial joint between the globe shell halves may be formed as shown in the enlarged detail view in FIG. 6. The spring clip 88 extends from a slot 90 in the upper half to a slot 92 in the lower half directly below it. There are 120 of these spring clips around the Equator, each clip not only contributing to the holding of the two halves together, but also forming one of the minute marks which are spaced 3 degrees apart around the Equator to provide two 60 minute scales, each extending half way around the Equator and cooperating with one of the two oppositely extending minute hands 44.

What is claimed is:
1. A globe map clock comprising
a transluscent globe map shell,
a 24-hr. clockworks mounted therein and having coaxial hour and minute shafts extending along the polar axis with a guide bearing at one of the Poles of said globe map shell,
light means in said globe map shell, and
means inside said shell driven by said clockworks for indicating the day of the year and for casting a shadow on a portion of said globe map shell in accordance with the day of the year indicated.
2. A globe map clock as defined in claim 1,
said globe map shell having 24 hour zones indicated by latitude lines thereon spaced at 15° intervals around the globe, and
means inside said globe map shell driven by said hour hand shaft to cast shadows of 24 hour lines radiating at 15° intervals from said one of said Poles with their hour numerals near or at the equator,
an equatorial minute scale around said globe map shell, and
means driven by said minute hand shaft for casting a shadow of a minute hand extending to said minute scale.
3. A globe map clock as defined in claim 1,
said clockworks being located substantially in the center of said shell,
said light means comprising a circular neon light mounted around said clockworks, and
an electric supply cord with an inlet plug connected in parallel to said clockworks and said light means.
4. A globe map clock as defined in claim 1,
said means driven by said clockworks for indicating the day of the year comprising
a gear housing mounted to turn with the hour shaft under the Arctic Circle area of the globe map shell,
a ring gear supported for rotation on the periphery of said housing and having a day scale visible through a cricular transparent portion of the globe map shell at the Arctic Circle,
a central gear having a pitch circle diameter ⅕ that of said ring gear mounted at the top of a tubular said hour shaft,
two intermediate gears of the same size as the central gear mounted in said housing on a common radius between said central gear and said ring gear to form a drive connection therebetween,
said tubular shaft having a 73 tooth gear at its lower end, a 74 tooth gear on said hour shaft just below said 73 tooth gear, and
a wide idler gear mounted on said clockworks meshed with both the 73 tooth gear and the 74 tooth gear for advancing said central gear ¹⁄₇₃ of a revolution with respect to the housing each day so as to advance said day scale ¹⁄₃₆₅ of a revolution each day automatically.
5. A globe map clock as defined in claim 3,
said means driven by said clockworks for casting a shadow on the darkness half of said globe map shell comprising
a darkened semi - transparent hemispherical shell mounted in closely spaced relation concentrically inside said globe map shell and pivoted at diametrically opposite points on its circular edge for rotation on an equatorial diametric axis at the equatorial edge of a transparent hemispherical shell mounted on the hour shaft,
said transparent shell having 24 hour lines radiating from the N Pole at 15 degree intervals to cast their images moving over the hour zones on said globe map shell,
said hour lines being designated at their lower ends by corresponding hour numerals moving along with them in accordance with the advancing time in each of the hour zones on the globe map.
6. A globe map clock as defined in claim 5,
said darkened hemispherical shell having guide slots at the poles for the hour shaft at the N Pole and a support shaft at the S Pole to pass through during angular tilt of said darkened shell about its diametral pivots,
said darkened hemispherical shell having lobes extending in its spherical plane from its circular edge in the polar regions to provide substantially 23 degree extensions of said guide slots to accommodate the hour shaft and the support shaft at all titlted positions of the darkened hemisphere, the lobes being clearly transparent,
a cross slot at the base of said N Pole lobe extending at least 23 degrees to each side of said polar slot, and
a swivably mounted slot guide plate on said ring gear and extending slidably into said cross slot for tilting said darkened hemispherical shell in accordance with the day of the year indicated on said day scale, said guide plate having a length in said cross slot equal to substantially twice the width of said polar slot to facilitate its guidance across the polar slot.
7. A globe map clock as defined in claim 6,
an equatorial minute scale around said globe map shell,
at least one quadricircular minute hand extending from said minute shaft at the Pole to the Equator,
said globe map shell comprising two halves joined at the equator by a radially stepped joint to provide surface alignment, and
spring clips holding the halves together at 3 degree intervals around the Equator and thus providing the minute marks for said minute scale.

References Cited
UNITED STATES PATENTS 3,305,946   2/1967   Gardin _____ 58—44

RICHARD B. WILKINSON, Primary Examiner

E. C. SIMMONS, Assistant Examiner

U.S. Cl. X.R.
5—46